Dec. 24, 1935.  F. HANFF  2,025,666
EXTRUSION DEVICE
Filed July 12, 1933  2 Sheets-Sheet 2
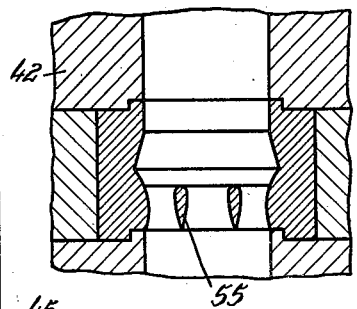
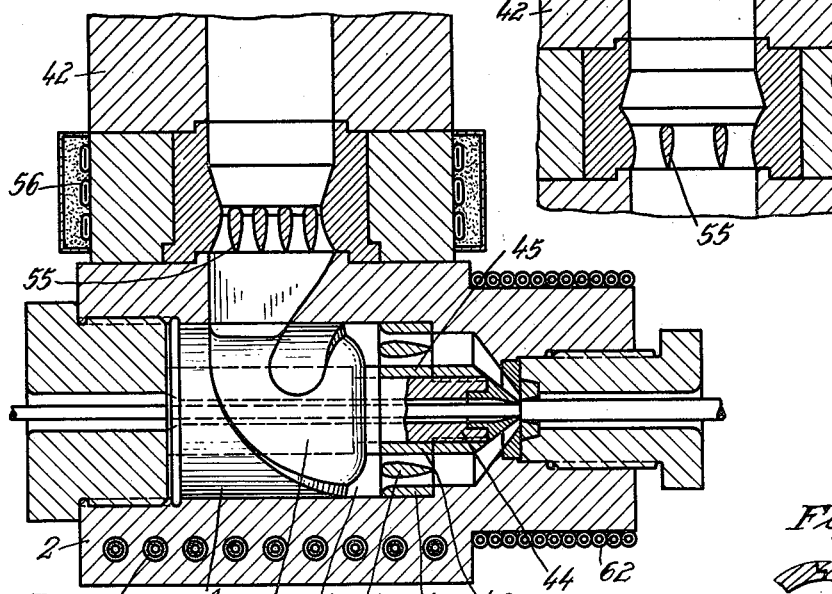
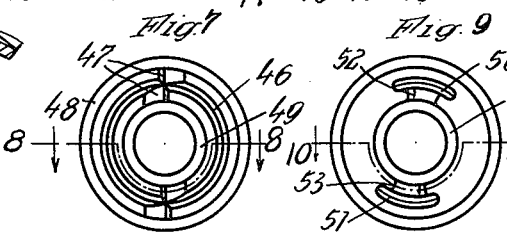
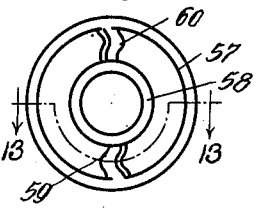
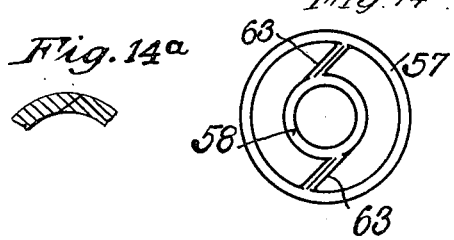

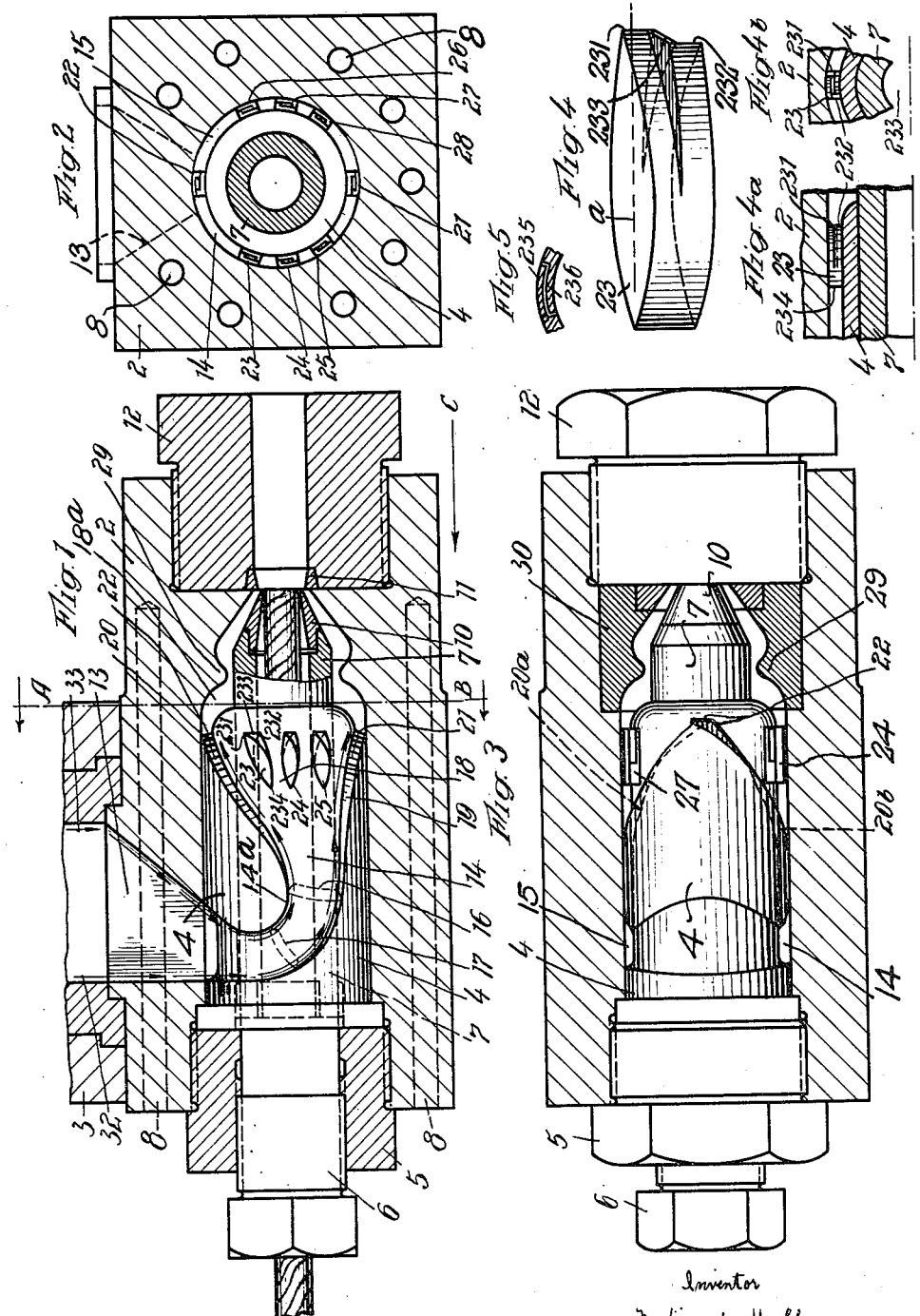

Patented Dec. 24, 1935

2,025,666

UNITED STATES PATENT OFFICE 2,025,666

EXTRUSION DEVICE

Ferdinand Hanff, Berlin-Charlottenburg, Germany, assignor to Siemens-Schuckertwerke Aktiengesellschaft, Berlin-Siemensstadt, Germany, a corporation of Germany Application July 12, 1933, Serial No. 680,020
In Germany February 22, 1932

9 Claims. (Cl. 207—4)

I have filed an application in Germany, February 22, 1932.

My invention relates to an extrusion device, and more particularly to an extrusion block for the manufacture of metallic tubes, for instance, of lead cable sheaths.

In the lead cable presses hitherto employed the passage for the cable lies at right angles to the axis of the container bore, and thereby one or several radially directed welding seams are formed during the extrusion process depending upon the shape of the extrusion chamber. These seams usually form weak points in the tube in the case of an inadequate operation of the press. If such cable sheaths are, for instance, employed for oil-filled cables the seams burst in most cases as a result of the inner pressure exerted on the cable sheath, which causes breakdowns and considerable cost of maintenance. Further, the product is thereby impaired owing to the different extrusion pressures prevailing in operation at the different points of the extrusion chamber. It has already been proposed to remedy such defects by the use of equalizing rings, but the desired result could not be attained.

My invention has for its object to overcome the foregoing drawbacks. To this end, first of all the extrusion chamber is provided either in its wall or in the wall of the equalizing cylinder with guide channels for the lead, shaped so that the stream lines of lead extending from the entrance of the extrusion chamber to the extrusion nozzle are approximately equal in length. By the equal length of the stream lines of lead an equal velocity of flow is brought about in all parts of the lead stream, thus ensuring a uniform wall thickness of the product. These channels are made gradually wider toward the extrusion nozzle.

In order to render the flow of lead as uniform as possible with respect to the velocity and pressure over the entire path and at all points of the cross-section, as a further novel feature projections forming a resistance to the flow of lead may be provided either in the enlarged portions of the channels near the extrusion nozzle, or at the point where the lead stream passes from the press cylinder into the cylindrical extrusion chamber proper. These projections are preferably made of a streamlined form. They vary the cross-section of the lead stream passing through these portions of the press. By the use of the projections the advantage is obtained that the flow of lead is divided and some portions of the flow of lead are forced towards the periphery, the portions in the center, however, being retained with respect to the velocity so as to result in a uniform pressure and uniform velocity of flow which are essential for the formation of a tube of a uniform wall thickness and strength. As a further and important feature of the invention, the trailing ends of the projections as well as the tapered ends of the lateral walls of the lead channels are preferably so formed that a lapped seam results. The mechanical properties of the product may be further improved by inserting equalizing rings in the pathway of the lead stream immediately before it enters the extrusion nozzle. These rings are arranged for the purpose of dividing the lead stream during the extrusion process into two or more branch streams. These equalizing rings have preferably a streamlined cross-section and are supported against or secured to the extrusion head walls or to the die holder or to both by means of elongated spokes which also have preferably a streamlined cross-section. They may be made of one piece, for instance, together with the core holder. The central planes of these spokes form an angle with the direction of flow of the lead stream at that point.

The equalizing rings are adjusted in such a manner that the streams of lead are separated by the spokes at the welding seams resulting from the construction of the press, and the aforementioned inclined position of the spokes produces a seam, whose faces have a direction different from the radial direction. At the same time the streams of lead may be divided by the equalizing rings into two tubes, one within the other and preferably of equal wall thickness which combine to form behind the equalizing ring a single tube as a result of the pressure exerted in all directions. Besides by these inclined spokes the seams of the two tubes may be offset against one another in radial direction.

My invention is illustrated in the accompanying drawings in which—

Fig. 1 is a longitudinal sectional elevation of the extrusion block.

Fig. 2 is a transverse section through Fig. 1 on the line A—B in Fig. 1 seen from the right hand side.

Fig. 3 is a central horizontal section through the extrusion block 2, Fig. 1, with the equalizing cylinder located in place.

Fig. 4 is a perspective view in larger scale of one of the projections 23, 24, 25 in Fig. 1.

Fig. 4a is a side elevation in smaller scale, and

Fig. 4b is a front elevation in smaller scale of the projection 23 in Fig. 2.

Fig. 5 is a detail sectional view of the overlapping seam of the lead sheath produced by the arrangement according to the invention.

Fig. 6 is a longitudinal sectional elevation of a modified form of the block construction shown in Fig. 1.

Fig. 7 is an elevation of an equalizing ring such as is shown at 45, 46 in Fig. 6.

Fig. 7a is a transverse section through the portion of a tube showing a seam produced according to Fig. 7.

Fig. 8 is a horizontal section through this ring on the line 8—8 in Fig. 7.

Fig. 9 is a modification of the equalizing ring shown in Fig. 7.

Fig. 10 is a horizontal section through the ring on line 10—10 in Fig. 9.

Figs. 12, 14, and 15 are further modifications of the equalizing ring shown in Fig. 7.

Fig. 13 is a horizontal section through the ring Fig. 12 on the line 13—13, and

Figs. 12a, 14a, and 15a are transverse sections through the portion of a tube showing a seam produced respectively according to Figs. 12, 14, and 15.

In Fig. 1 the extrusion block is denoted by the numeral 2. The cylindrical receiver 3 is mounted on the block 2. The latter contains an equalizing cylinder 4 which is secured in the extrusion block by a nut 5, into which is threaded a hollow bolt 6 for adjusting the core holder 7. The cable C to be sheathed passes through this hollow bolt. The extrusion block 2 is provided with bores 8 for the reception of heating elements. 10 denotes the die core through which the cable to be sheathed passes, 11 the die and 12 the die holder. The extrusion block 2 has at its upper part an intake port 13 having at its junction point with receiver 3 a diameter equal to that of the receiver bore. The walls of port 13 are tapered toward the horizontal axis of the extrusion block, in order that the length of all stream lines of the lead stream with respect to the extrusion at the point may be equal.

Port 13 has at the point where the material to be extruded meets the equalizing cylinder 4 preferably a square cross-section so as to permit easier passage of the lead from the extrusion block 2 around both sides of the equalizing cylinder 4. This cylinder is provided at both sides with channels 14 and 15 recessed into the surface of cylinder 4 as will be seen from Fig. 2. Into these channels the lead flows from port 13. The channel 14 is shown in elevation in Fig. 1. The channels are designed in the form of a trumpet so as to obtain pathways of equal length for the individual particles of the flowing lead. The cross-sections of the channels are shown in Fig. 1 by the dotted lines 16 and 17. In the enlarged portion 18, that is to say, near the point where the material to be extruded enters the annular extrusion chamber 18a the channel walls 20a and 20b are tapered toward one another near the right hand end of cylinder 4 at the points 21, 22 as shown in Figs. 1, 2, and 3. Further, in the widened portion of the channel 14 projections 23, 24, 25, and in the widened portion of channel 15 diametrically oppositely located projections 26, 27, 28 are arranged as will be apparent from Fig. 2. In Fig. 1 only projections 23, 24, 25 of channel 14 are visible. These projections have preferably a streamlined form as disclosed in Fig. 4, in perspective view with respect to projection 23 in Fig. 1. They form a resistance to the flow and they are so designed that the streams of lead running off at the trailing edges thereof form overlapping seams as shown in Fig. 5. As Fig. 4 shows, the radially disposed trailing edge 232 lies in front of the central longitudinal axis a of the projection, while the radially disposed trailing edge 231 lies behind this axis. The trailing edge 233 is circumferentially disposed with respect to cylinder 4, and forms with the other two edges a zigzag line, corresponding with the zigzag overlap shown in Fig. 5. Figs. 4a and 4b show projection 23 in side and front elevation respectively. The points 21, 22 at which the channel walls 20a and 20b meet as aforementioned are shaped similar to the ends of projections 23, 24, 25, so that also at these points overlapping joints are formed as shown in Fig. 5.

The overlap is effected in such a manner that the edge of the stream of lead passing to one side of a projection, owing to the configuration of the latter just described, is forced beneath the edge of the stream of lead passing around the other side of the projection.

In the right hand annular portion of the extrusion chamber an annular ridge 29 is arranged. The extrusion block 2 may thus be made cylindrical merely for the positioning of the equalizing cylinder 4. In this manner an extremely light, simple and relatively sturdy as well as an economical design of the extrusion block is possible which, therefore, may consist of one piece as shown in Fig. 1. In order to do away with the machining of the inwardly protruding annular projection 29 of the extrusion block and to permit an easy replacement of the part 29 by others of different shapes a particular insert 30 as shown in Fig. 3 may be arranged in the extrusion block, which insert 30 is firmly held in the block 2 by the die holder 12. In giving the proper form to the lead sheaths it is essential that the lines of flow of which two are indicated by the arrows 32 and 33 shown in Fig. 1 be of equal or approximately equal length. To attain the necessary length of the line of flow 33, the upper channel edges 14a, 15a of the equalizing cylinder 4 (only 14a is visible in Fig. 1) must be so machined as to give the two channels 14 and 15 a saddle-shaped appearance. In this manner a simple design of the channel is obtained having pathways for the flow of lead of equal length at all points.

The guide channels 14, 15 may also be machined into the interior of the equalizing cylinder 4.

In this case the latter is longitudinally divided in such a manner as to facilitate a machining of the channels. After machining the channels the constituent parts of the equalizing cylinder 4 may be assembled, for instance, by welding them together. Also in this case the extrusion block 2 is only provided with a cylindrical bore for the reception and positioning of the equalizing cylinder. The equalizing cylinder 4 is preferably slightly tapered towards the core so as to permit its easy insertion and removal.

Fig. 6 shows another embodiment of my invention. 42 denotes the cylindrical container, 43 the extrusion chamber, 44 the core holder. In this embodiment an equalizing ring 45 is arranged which as shown in Figs. 7 and 8 includes an outer ring 46 and spokes 47. For securing this equalizing ring 45 within the press an outer ring 48 and an inner ring 49 are provided. The ring 46 is arranged in such a manner that it divides the flow of lead into two tubes having the same wall thickness and lying within one another.

The spokes 47 supporting the ring 46 are displaced and so designed that the central plane of the spoke traversing the wall of the tube to be exteriorly formed, is located at an angle to the direction of flow of the lead while the spoke traversing the wall of the tube to be interiorly formed, is similarly inclined to the direction of the lead flow, but oppositely to the inclination direction of the other spoke, as shown in Fig. 8 by the spokes in full and dotted lines. The equalizing rings are so adjusted that the cutting edges of the spokes radially offset the welding seams resulting from the interposition of the spokes into the two streams.

An equalizing ring with ring segments instead of rings is shown in Figs. 9 and 10. The ring segments are denoted by 50 and 51. They are supported by spokes 52 and 53 inclined similarly to the spokes shown in Figs. 7 and 8. The equalizing ring is mounted on the core holder 44 in Fig. 6 by the ring 54.

In order to ensure a kneading of the material to be extruded before entering the extrusion chamber an intermediate grid 55 as shown in Fig. 6 is arranged according to the invention between the extrusion chamber and the cylindrical receiver and is perforated in the form of a sieve. By this grid the material to be extruded is subdivided into several branch streams already before the formation of the tube. Since the lead must pass a restriction and then an enlargement, a shifting of the crystals and a kneading of the material is thereby attained. This intermediate grid is preferably heated exteriorly, the heating element 56 being provided for this purpose. This measure supports a welding of the divided streams of lead after the latter leave the grid. Another form of intermediate grid is shown in Fig. 11. This differs from that shown in Fig. 6 in that above the sieve the passage for the material to be extruded is at first enlarged and then restricted. This design has the advantage over that shown in Fig. 6 in that on recession of the press piston the material is not torn apart in the sieve as occurs according to Fig. 6 but the rest of the material to be extruded remains in the receiver when the press ram is removed for introducing a new charge.

In some cases a considerable improvement of the metallic tube is obtained if the tubular portions to be united with one another are so formed by the equalizing rings that they engage one another in the form of a groove joint or that they overlap one another at the joints and are then welded in this position so as to result in a groove joint-like or lapped welding seam.

Figs. 12 and 13 show an elevational side and sectional view respectively of the ring with which a groove joint-like or wave-shaped welding seam may be obtained. 57 denotes the outer, 58 the inner ring and 59 and 60 denote the spokes by which a valve form seam of the shape of the spokes is produced.

A diagonally lapped welding is obtained with the equalizing ring shown in Fig. 14 by means of the tangential spokes 63, and a more distinctly tongue-and-groove form with the ring shown in Fig. 15, by means of the corrugated spoke 64. The welding of the segregated streams of lead is supported by the application of heat which may, for instance, be applied by electric heating elements arranged in the wall of the extrusion block 2, as shown at 61. The extrusion block is cooled in the neighborhood of the die holder by tube coils 62 wound around the end of the extrusion block in order to cool the tube which is being formed in the die.

The equalizing rings are not limited to the form shown. The invention is also applicable according to the same principle to lead presses other than the above-described, for instance for manufacturing tubes, regardless of the material of which the tubes may consist; for instance also to horizontal presses with two receivers located opposite one another, and in which there is no particular extrusion block, but the extrusion chamber with the receivers consists of one piece.

While the invention lends itself broadly to lead presses, it is particularly suited for those in which the stream of lead is divided by particular devices and in which lead sheaths arranged concentrically with respect to one another are formed, as well as to those presses in which the direction of flow of the lead is reversed in the extrusion chamber.

I claim as my invention:

1. In an extruding press for producing metallic tubes, an extrusion block having an extrusion chamber, means for supplying metal in a state of flux to said chamber, a core and a core holder in said chamber and an extrusion die cooperatively disposed with relation to said core, ducts between said core holder and the wall of said chamber for conducting the metal to said die, and resistance elements interposed into the metal stream ahead of said die, for splitting the stream into a plurality of streams to be welded together during the extrusion, said elements having at least a portion of their contact surface with the metal positioned at an angle to the radial direction of the core, to produce between the welded surfaces of the divisional streams a transverse seam line which runs through the entire wall of the extruded tube, and which is at least at one point of its path directed at an angle to the radial direction.

2. In an extruding press for producing metallic tubes, an extrusion block having an extrusion chamber, means for supplying metal in a state of flux to said chamber, a core and a core holder in said chamber and an extrusion die cooperatively disposed with relation to said core, ducts between said core holder and the wall of said chamber for conducting the metal to said die, and resistance elements interposed into the metal stream ahead of said die, for splitting the stream into a plurality of streams to be welded together at the edges during the extrusion, said elements being contoured to form adjacent edge surfaces of the divisional streams into complementary shaped profiles to produce an overlapping seam.

3. In an extruding press for producing metallic tubes, an extrusion block having an extrusion chamber, means for supplying metal in a state of flux to said chamber, a core and a core holder in said chamber and an extrusion die cooperatively disposed with relation to said core, ducts between said core holder and the wall of said chamber for conducting the metal to said die, and rings interposed into the metal stream before it enters the die, said rings having spokes for splitting the metal stream into a plurality of streams to be welded together at the edges during the extrusion, said spokes being suitably contoured to form adjacent edge surfaces of the divisional streams into complementary shaped profiles to produce overlapping seams.

4. In an extruding press for producing metallic tubes, an extrusion block having an extrusion chamber, means for supplying metal in a state of flux to said chamber, a core and a core holder in said chamber and an extrusion die co-operatively disposed with relation to said core, ducts between said core holder and the wall of said chamber for conducting the metal to said die, and a plurality of concentric spaced rings interposed into the metal stream before it enters the die, and spokes connecting said rings, for dividing the metal stream into a plurality of concentric tubular streams of substantially equal thickness to be welded together during the extrusion, said spokes dividing each tube into a plurality of segments to be welded at their edges during the extrusion, said spokes being suitably contoured and offset with relation to one another to circumferentially offset the seam of one tube with respect to the seam of the other tube.

5. In an extruding press for producing metallic tubes, a receiver cylinder containing the metal to be extruded, an extrusion chamber connected to said receiver and a grid disposed at the entrance to said extrusion chamber for dividing the metal entering the extrusion chamber into a plurality of streams, the path for the metal being widened beyond the cylinder diameter immediately ahead of said grid, and being contracted below the cylinder and the extrusion chamber entrance diameter at the point where the grid is located.

6. In an extruding press for producing metallic tubes, a receiver cylinder containing the metal to be extruded, an extrusion chamber connected to said receiver and having a funnel-shaped entrance and a contracted throat preceding said entrance, and a grid disposed in said throat for dividing the metal entering said funnel-shaped entrance into a plurality of streams to produce a kneading of the extrusion material before it reaches the extrusion point.

7. An extruded closed lead sheath having at least one longitudinal seam welded during extrusion, the faces of said seam forming a zig-zag line through the tube wall.

8. An extruded closed lead sheath having at least one longitudinal seam welded during extrusion, one edge of said seam being tongued and the other grooved.

9. An extruded closed lead sheath composed of two tubes simultaneously extruded one within the other and welded together circumferentially during the extrusion to form a single finished tube, each of said two tubes having at least one seam welded during extrusion, the seams of the two tubes being offset in circumferential direction with respect to one another to form together with the intervening welded circumferential tube portions a zig-zag line seam running transversely through the wall of the entire extruded tube.

FERDINAND HANFF.